US009965558B2

(12) United States Patent
Puligundla et al.

(10) Patent No.: US 9,965,558 B2
(45) Date of Patent: May 8, 2018

(54) CROSS-CHANNEL SOCIAL SEARCH

(71) Applicant: International Business Machines Corporation, Armonk, NY (US)

(72) Inventors: Sricharan Puligundla, Stamford, CT (US); Karthik Subbian, Falcon Heights, MN (US); Laura Wynter, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 13/923,338

(22) Filed: Jun. 20, 2013

(65) Prior Publication Data
US 2014/0379681 A1 Dec. 25, 2014

(51) Int. Cl.
*G06F 17/30* (2006.01)

(52) U.S. Cl.
CPC .............. *G06F 17/30867* (2013.01)

(58) Field of Classification Search
CPC .......................... G06Q 50/01; G06F 17/30864
See application file for complete search history.

(56) References Cited

U.S. PATENT DOCUMENTS

| 7,530,021 | B2* | 5/2009 | Cheng ................. G06Q 10/109 705/7.19 |
| 7,900,052 | B2 | 3/2011 | Jonas |
| 7,949,643 | B2 | 5/2011 | Kawale et al. |
| 7,974,957 | B2 | 7/2011 | Xie et al. |
| 8,121,999 | B2 | 2/2012 | Hansen |
| 8,122,041 | B2 | 2/2012 | Kamireddy et al. |
| 8,195,656 | B2 | 6/2012 | Grasset |
| 8,346,864 | B1* | 1/2013 | Amidon et al. ............. 709/204 |
| 8,548,918 | B1* | 10/2013 | Amidon et al. ............. 705/51 |
| 8,706,739 | B1* | 4/2014 | Song ................. G06F 17/30867 707/748 |
| 2007/0106627 | A1 | 5/2007 | Srivastava |
| 2008/0147884 | A1* | 6/2008 | Kwon ......................... 709/243 |
| 2008/0229244 | A1* | 9/2008 | Markus et al. ............. 715/811 |
| 2009/0125511 | A1 | 5/2009 | Kumar |
| 2009/0210403 | A1 | 8/2009 | Reinschmidt et al. |
| 2010/0114862 | A1 | 5/2010 | Young et al. |
| 2010/0161634 | A1 | 6/2010 | Caceres |
| 2011/0295626 | A1* | 12/2011 | Chen ..................... G06Q 30/02 705/7.11 |
| 2012/0030185 | A1 | 2/2012 | Gnanamani et al. |

(Continued)

OTHER PUBLICATIONS

Brin, S. et al., "The Anatomy of a Large-Scale Hypertextual Web Search Engine," Computer Networks and ISDN Systems, vol. 30, Issue 1-7, Elsevier, Apr. 1998, pp. 107-117.

(Continued)

*Primary Examiner* — Christopher J Raab
(74) *Attorney, Agent, or Firm* — Laura E. Gisler

(57) ABSTRACT

Search results are received that were generated by a search engine in response to a search query entered by a user. The search results include a first result which contains a first set of identifying data. The first result is matched with a first profile on a first social network which is merged with a second social network. The first profile contains a second set of identifying data which satisfies matching criteria for similarity with the first set of identifying data.

20 Claims, 5 Drawing Sheets

(56) References Cited

U.S. PATENT DOCUMENTS

| | | | | |
|---|---|---|---|---|
| 2012/0259915 | A1* | 10/2012 | Bhatt | G06Q 50/01 709/204 |
| 2013/0031171 | A1* | 1/2013 | Serena | 709/204 |
| 2013/0054277 | A1* | 2/2013 | Hirmer et al. | 705/5 |
| 2013/0254213 | A1* | 9/2013 | Cheng | G06Q 50/01 707/748 |
| 2013/0254305 | A1* | 9/2013 | Cheng et al. | 709/206 |
| 2013/0282417 | A1* | 10/2013 | Gaedcke | G06Q 30/016 705/7.13 |
| 2014/0067535 | A1* | 3/2014 | Rezaei | G06F 17/30598 705/14.54 |
| 2014/0074928 | A1* | 3/2014 | B'Far | H04L 67/306 709/204 |
| 2014/0304247 | A1* | 10/2014 | Fastlicht | 707/706 |
| 2015/0293997 | A1* | 10/2015 | Smith | H04L 51/32 707/749 |
| 2015/0339785 | A1* | 11/2015 | Bischke | G06Q 50/01 705/319 |

OTHER PUBLICATIONS

Subbian, K. et al., "Supervised Rank Aggregation for Predicting Influences in Twitter," 2011 IEEE International Conference on Privacy, Security, Risk and Trust, and IEEE International Conference on Social Computing, Aug. 30, 2011, SocialCom/PASSAT 2011: 661-665.

Frank, H., "Shortest Paths in Probablistic Graphs," Operations Research, Jul./Aug. 1969, vol. 17, No. 4, pp. 583-599, published by INFORMS, http://www.jstor.org/stable/168536, accessed: Mar. 4, 2013 18:15.

Wu, H.C. et al., "Interpreting TF-IDF Term Weights as Making Relevance Decisions," ACM Transactions on Information Systems, vol. 26, No. 3, Article 13, pp. 1-37, Jun. 2008.

Salton, G. et al., "Term-Weighting Approaches in Automatic Text Retrieval," Information Processing and Management, vol. 24, No. 5, pp. 513-523, 1988.

* cited by examiner

CROSS-CHANNEL SOCIAL SEARCH

FIELD OF THE INVENTION

The present disclosure relates to the field of content searching and more particularly to cross-channel social network searching.

BACKGROUND

Web users can access several different channels to find information. To find general information, a user can search using a typical online search engine. Additionally, to find information about people a user knows, the user can search on their online social and professional networks. Further, to find spatial information, a user can use a spatial engine such as an online maps service.

SUMMARY

Disclosed herein are embodiments of a method for processing search results. The method includes receiving the search results where the search results were generated by a search engine in response to a search query entered by a user and the search results including a first result with the first result containing a first set of identifying data. The method further includes matching the first result with a first profile on a first social network, with the first profile containing a second set of identifying data, the second set of identifying data satisfying matching criteria for similarity with the first set of identifying data, and the first social network being merged with a second social network.

Also disclosed herein are embodiments of a computer program product for processing search results. The computer program product includes a computer readable storage medium having program code embodied therewith, with the program code executable by a computer system to perform a method. The method includes receiving, by the computer system, the search results where the search results were generated by a search engine in response to a search query entered by a user and the search results including a first result with the first result containing a first set of identifying data. The method further includes matching the first result with a first profile on a first social network, with the first profile containing a second set of identifying data, the second set of identifying data satisfying matching criteria for similarity with the first set of identifying data, and the first social network being merged with a second social network.

Also disclosed herein are embodiments of a cross-channel search system. The system includes comprising a system for merging two or more social networks by linking profiles with identifying data which satisfies linking criteria for similarity. The system further includes a system for matching search results to profiles on the two or more merged social networks by matching identifying data which satisfies matching criteria for similarity.

DETAILED DESCRIPTION

Figure 1:
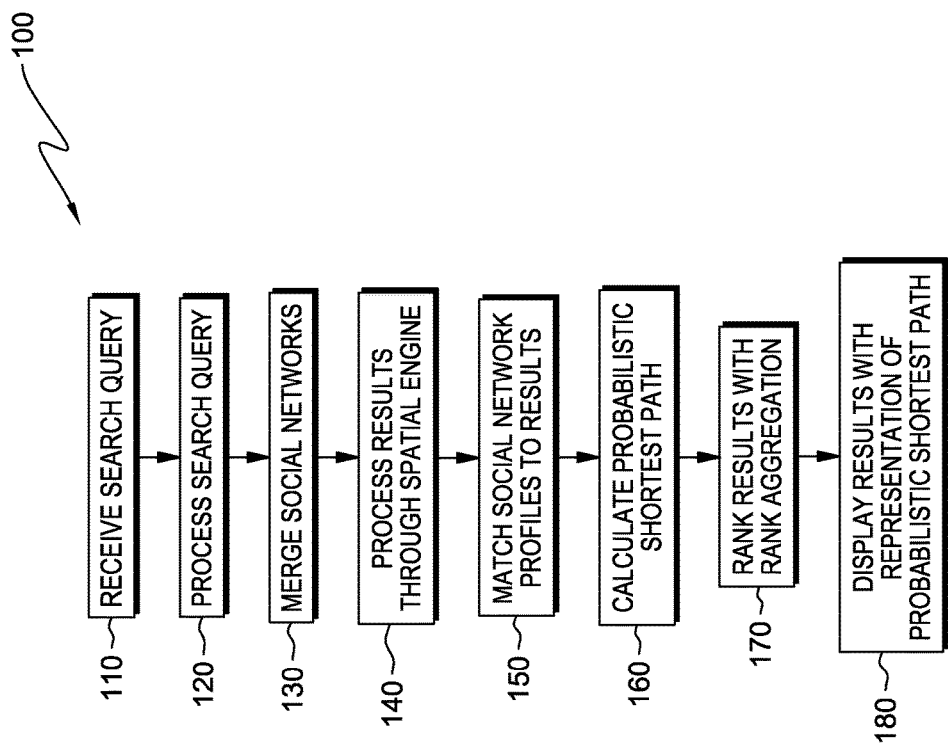
FIG. 1 depicts a flow diagram of an example method for processing search results.

Often users need to cross channels with their searches. For example, users may make use of a normal search engine which will give them a list of relevant results. Once a user has these results, they may need to conduct a spatial search to find if the results are close to a particular location. Further, the user may search their online social and professional networks to find people they know who may have information about one of the search results.

In one or more embodiments, we provide for cross-channel social network searching which may combine a typical web search with a social search across multiple social networks. An embodiment may start with receiving a search query from a user. A search engine may process the search query on a source of unstructured information such as the World Wide Web to retrieve a set of results. The results may be matched to an individual that the user is associated with through one or more social networks. Additionally, the results may be ranked using a rank aggregation method to combine the relevancy rank of the search results with a rank based on the probabilistic shortest path from a social network connection to the user.

A user interface may be presented to a user through an internet browser or other method. A user may enter a search query into a search query field on the user interface. In some embodiments, a user interface may allow a user to log in to an account which stores data about the user such as the user's social network profile information or the user's location. In some embodiments, the user interface may have fields in addition to the search query field for entering social network profile information or location information. The user could enter their own social network profile information or they could enter information on a social network profile which represents another. A search engine may process the search query entered by the user on a source of unstructured information such as the World Wide Web and generate results. The search engine may be any type of engine capable of retrieving results in response to a search query. In alternative embodiments the search engine may process the search query on a source of structured information.

In one or more embodiments, two or more social networks may be merged. For purposes of this application the term social networks will also include professional networks or any other online network of people or other entities. Merging the social networks includes linking profiles which may represent the same individual across two or more social networks. This may require that the social networks expose their application programming interface to external programs. Profiles across two or more social networks may be searched to find pairs of profiles on different social networks containing identifying data which is the same or similar. These profiles may then be linked if the identifying data satisfies merge criteria for similarity. Merge criteria for similarity may be set by the user or may be predetermined. Merge criteria for similarity may include a minimum amount of similarity of identifying information between profiles. Identifying data can include name, address, phone number, employer or any other information which could be used to identify an individual. Some profiles may be linked with more than one profile on other social networks. Alternative links may be maintained with similarity scores given to each pair of linked profiles. This similarity score is calculated based on the similarities and discrepancies between the identifying data stored on each profile. The similarity score indicates the likelihood that the two linked profiles represent the same individual. A probability distribution of similarity scores across the cross-channel links may be computed and maintained. For example, the cosine similarity $$Sim(u, v) = \frac{\sum_{i \in F} u_i v_i}{\|u\| \|v\|}$$

and a Jaccard coefficient $$J(A, B) = \frac{|N(A) I N(B)|}{|N(A) Y N(B)|}$$

may be used to find similarities in case of an entity conflict and maintain a probabilistic edge weight based on the distribution of these similarities. Here N(A) refers to the set of all neighbors of individual, or other entity, A in a social network and $u_j$, corresponds to the set of categorical, or numerical identifying information such as location, employer, etc.

The results of the web search may be matched with profiles on one or more social networks. Identifying data may be used for this purpose. A profile may be matched to the result if the identifying data satisfies linking criteria for similarity. Linking criteria for similarity may be set by the user or may be predetermined. Linking criteria for similarity may include a minimum amount of similarity of identifying information between profiles. The linking criteria for similarity may be the same as the matching criteria for similarity, or they may be different. For example, a job posting may have a name, address, or phone number for the person who posted the job. If the person who posted the job has a social network profile with the same or similar information, the social network profile may be matched to the job posting. Some results may not have a match with a profile on a social network and other results may have multiple matches.

Potential profiles to be matched with a result may include any profile on any social network, profiles which are a certain number of direct associations away from the user's social network profiles, or any other subset of profiles. A direct association could include a "friend", "follower", "connection", or any other direct association between profiles on a social network site. For example, a profile two direct associations away from a user could be a follower of a friend of the user.

After a social network profile is matched to a search result, a probabilistic shortest path may be calculated from that social network profile to a user determined social network profile. The probabilistic shortest path takes into account the number of direct associations in the path between the user determined profile and the matched profile and the probability distribution of similarity scores for paths which cross social networks through linked profiles. The results may then be ranked based on the length of the probabilistic shortest path from the matched profile to the user determined social network profile.

The results may then be ranked using a rank aggregation method which combines a ranking based on information relevancy with the ranking of the probabilistic shortest path. The relevancy rank may be created using PageRank, TFIDF, or any other method of ranking search results. Any rank aggregation method can be used. One type of rank aggregation method which can be used is Kemeny optimal aggregation. Kemeny optimal aggregation is an aggregation method which has the minimum number of pairwise disagreements with all the rankers. Kemeny optimal aggregation can optionally include performance tuning parameter $w^r$. The performance tuning parameter can be used to weight the rankers based on the past performance of the rankers.

Kemeny optimal aggregation minimizes the Kendall-Tau distance by performing the operation $$\min_x \sum_{(i,j)} \left( x_{ij} \sum_r w^r v_{ji}^r + x_{ji} \sum_r w^r v_{ij}^r \right)$$

with ordering constraint $x_{ij}+x_{ji}=1$, $\forall i, j$ and no cycle constraint $x_{ij}+x_{jk}+x_{ki} \geq 1$, $\forall i, j, k$, where $x_{ij} \in [0,1]$ and $w^r \geq 0$. $v_{ji}^r=1$, if j is ranked above i for ranker r, 0 otherwise. $x_{ij}=1$, if j is ranked above i, 0 otherwise.

The results may then be displayed with a representation of the probabilistic shortest path. This representation could include pictures, names, or other information representing the profiles which comprise the probabilistic shortest path. The representation may further show the applicable association between each profile such as "friend" or "follower." Alternatively, the results may be displayed with just the representation of the matched profile.

In some embodiments, the results may be processed through a spatial engine. The spatial engine may find locations associated with the results and calculate the distance from the results to a user designated location. The spatial engine may remove results which are further than a specified distance away from the designated location. The user designated location may be a location entered by a user in the search query, in a separate field in the user interface, or it may be a location specified in the user's profile. The specified distance may be determined by the user or may be predetermined. In an alternative embodiment the spatial engine may simply provide a rank to the results based on distance from the specified location instead of removing results. This rank may be aggregated with the relevance rank and probabilistic shortest path rank.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an example method 100 for a cross-channel social search is illustrated. At step 110, a search query is received from a user. At step 120, the search query is processed on a source of unstructured information to generate results. This step may be performed by a typical search engine. At step 130, two or more social networks are integrated. This step may include linking profiles across two or more social networks which contain the same or similar identifying information if linking criteria for similarity is satisfied. At step 140, the results are processed through a spatial engine. The spatial engine may eliminate results which are further away than some set distance from a specified location. Alternatively, the spatial engine may rank the results based on the distance from the specified location. At step 150, profiles on social networks are matched with results. A profile may be matched with a result which contains the same or similar identifying information if matching criteria for similarity is satisfied. At step 160, a probabilistic shortest path is calculated from each matched profile to one of the user's social network profiles. In alternative embodiments the shortest path may be calculated without taking into account probability. At step 170, the results are ranked using a rank aggregation method which aggregates a relevance rank with a rank based on probabilistic shortest path. If the spatial engine has ranked the results, this rank may also be used in the rank aggregation. At step 180, the results are displayed with a representation of the probabilistic shortest path.

Figure 2:
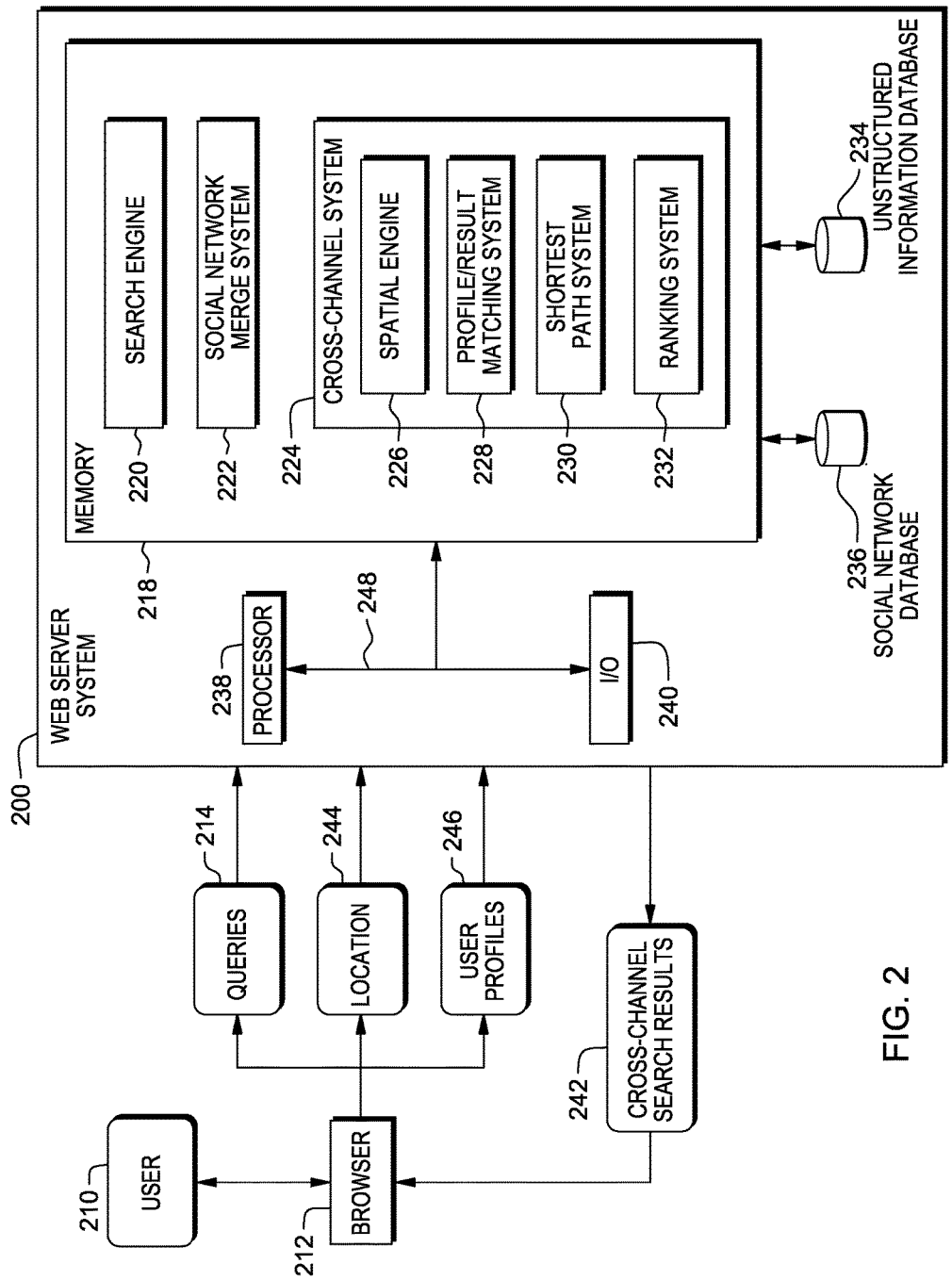
FIG. 2 depicts an example cross-channel search system.

FIG. 2 depicts a web server system 200 having a search engine 220 for searching a source of unstructured information 234 such as the World Wide Web. As shown, queries 214 may be submitted from a browser 212 to the search engine 220 to generate a set of search results to be used by cross-channel system 224.

Social network merge system 222 may use a social network database 236, which contains data regarding two or more social networks, to merge two or more social networks. Social network merge system 222 may find profiles on different social networks which contain the same or similar identifying information and link the profiles together if they satisfy linking criteria for similarity. Further, social network merge system 222 may assign similarity scores for each pair of linked profiles and calculate a probability distribution of similarity scores across the cross-channel links.

Cross-channel system 224 may generally include: a spatial engine 226 for determining spatially relevant search results; a profile/result matching system 228 for matching social network profiles to the search results; a shortest path system 230 for calculating the probabilistic shortest path between a result matched with a social network profile and the user's social network profile; and a ranking system 232 for calculating an aggregate rank of the search results using a relevance rank and a rank based on the probabilistic shortest path.

Spatial engine 226 may take location data in each of the search results and calculate the distance between the results and a location 244 input by the user. Further, spatial engine system 226 may remove results which are further than a specified distance from location 244 or it may rank the results based on distance from location 244.

Profile/result matching system 228 may match results to social network profiles which contain the same or similar identifying information if matching criteria for similarity is satisfied. Some results may not be matched with a social network profile and some may be matched with multiple social network profiles.

Shortest path system 230 may calculate a probabilistic shortest path from each result to the user's social network profiles 246. Shortest path system 230 may use the number of direct associations between a matched profile and one of the user's social network profiles and take into account probability distributions for profiles linked across social networks.

Ranking system 232 may rank the results using a rank aggregation technique to aggregate a relevancy rank and a rank based on the length of the probabilistic shortest path. In embodiments where spatial engine 226 ranks the results by distance, ranking system 232 may additionally aggregate the distance ranking. Ranking system 232 may produce cross-channel search results 242 which may be returned to browser 212.

It is understood that web server 200 may be implemented as any type of computing infrastructure. Such a computing infrastructure generally includes a processor 238, input/output (I/O) 240, and bus 248. Processor 238 may comprise a single processing unit, or be distributed across one or more processing units in one or more locations, e.g. on a client and server. Memory 218 may comprise any known type of data storage and/or transmission media, including magnetic media, optical media, random access memory, read-only memory, a data cache, a data object, ect. Moreover, memory 218 may reside at a single physical location, comprising one or more types of data storage, or be distributed across a plurality of physical systems in various forms.

I/O 240 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, ect. Bus 248 provides a communication link between each of the components in web server system 200 and likewise may comprise any known type of transmission link, including electrical, optical, wireless, ect. Although not shown, additional components, such as cache memory, communication systems, system software, ect., may be incorporated.

Access to web server system 200 may be provided over a network such as the Internet, a local area network, a wide area network, a virtual private network, etc. Communication could occur via a direct hard-wired connection (e.g., serial port), or via an addressable connection that may utilize any combination of wireline and/or wireless transmission methods. Moreover, conventional network connectivity, such as Token Ring, Ethernet, WiFi, or other conventional communications standards could be used. Still yet, connectivity could be provided by conventional TCP/IP sockets-based protocol. In this instance, an internet service provider could be used to establish interconnectivity. Further, as indicated above, communication could occur in a client-server or server-server environment.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
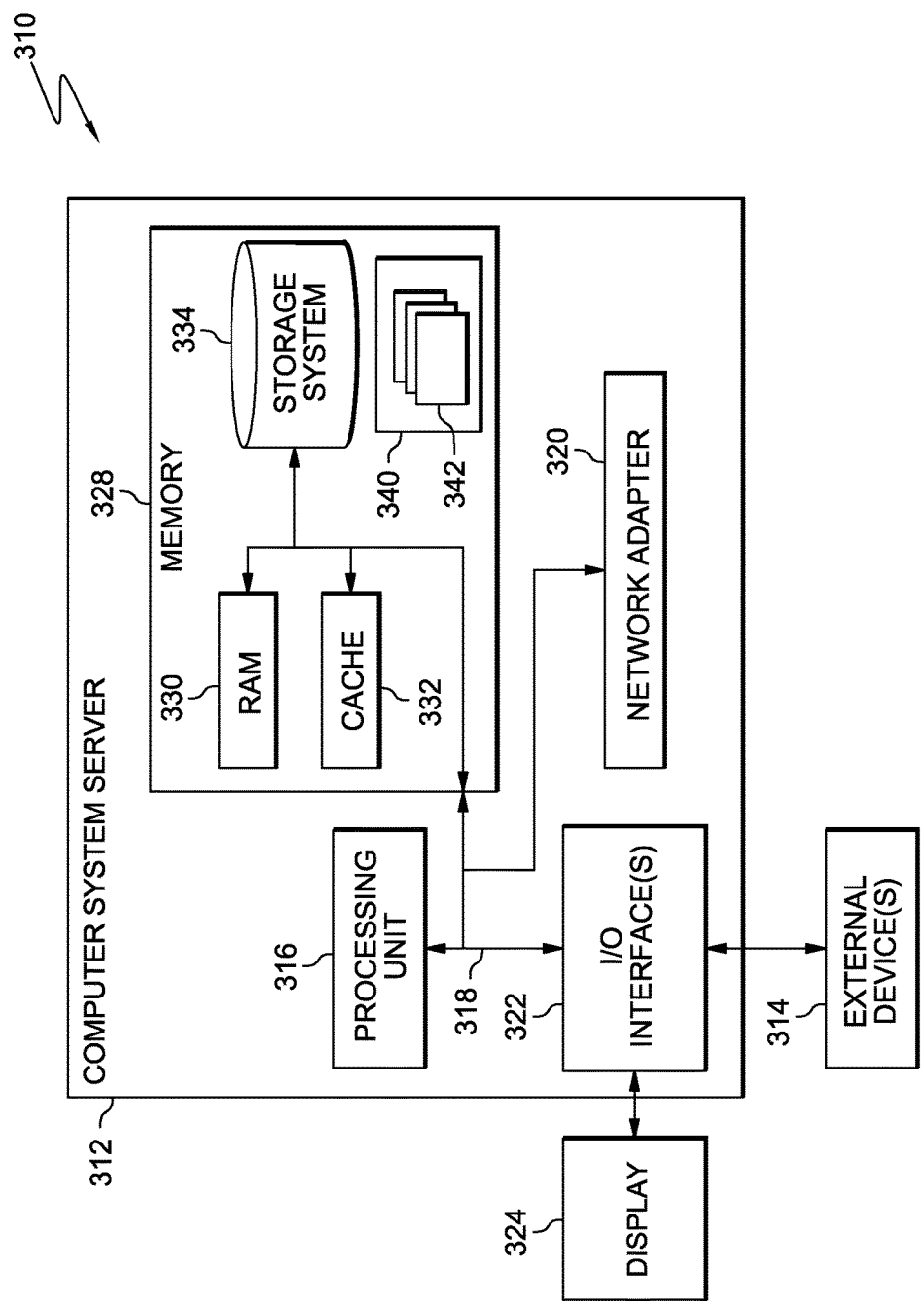
FIG. 3 depicts a schematic of an example of a cloud computing node.

Referring now to FIG. 3, a schematic of an example of a cloud computing node is shown. Cloud computing node 310 is only one example of a suitable cloud computing node and is not intended to suggest any limitation as to the scope of use or functionality of embodiments of the invention described herein. Regardless, cloud computing node 310 is capable of being implemented and/or performing any of the functionality set forth hereinabove.

In cloud computing node 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 310 is shown in the form of a general-purpose computing device. The components of computer system/server 312 may include, but are not limited to, one or more processors or processing units 316, a system memory 328, and a bus 318 that couples various system components including system memory 328 to processor 316.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Figure 4:
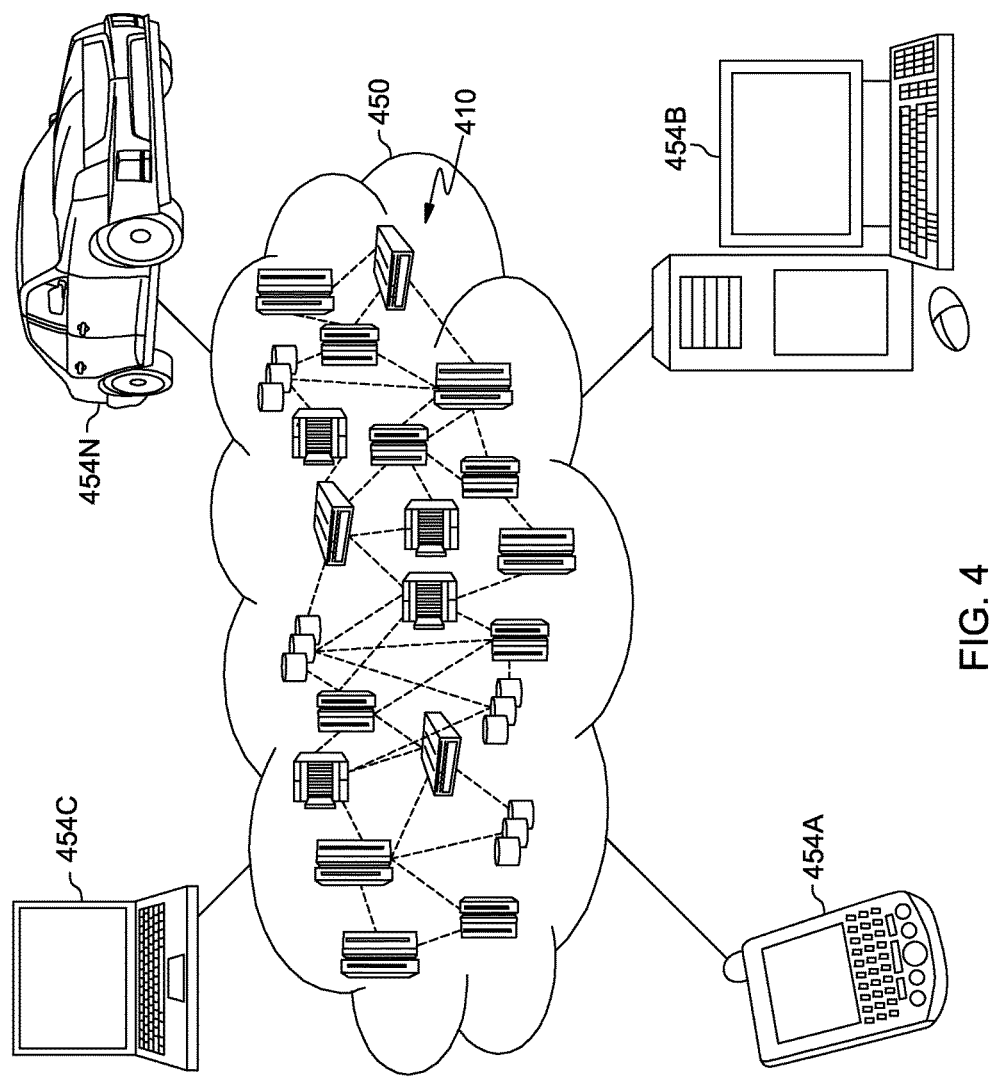
FIG. 4 depicts an example cloud computing environment.

Referring now to FIG. 4, illustrative cloud computing environment 450 is depicted. As shown, cloud computing environment 450 comprises one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 2 are intended to be illustrative only and that computing nodes 410 and cloud computing environment 450 can communicate with any type of computerized device over any type of network and/or network addressable connection (e.g., using a web browser).

Figure 5:
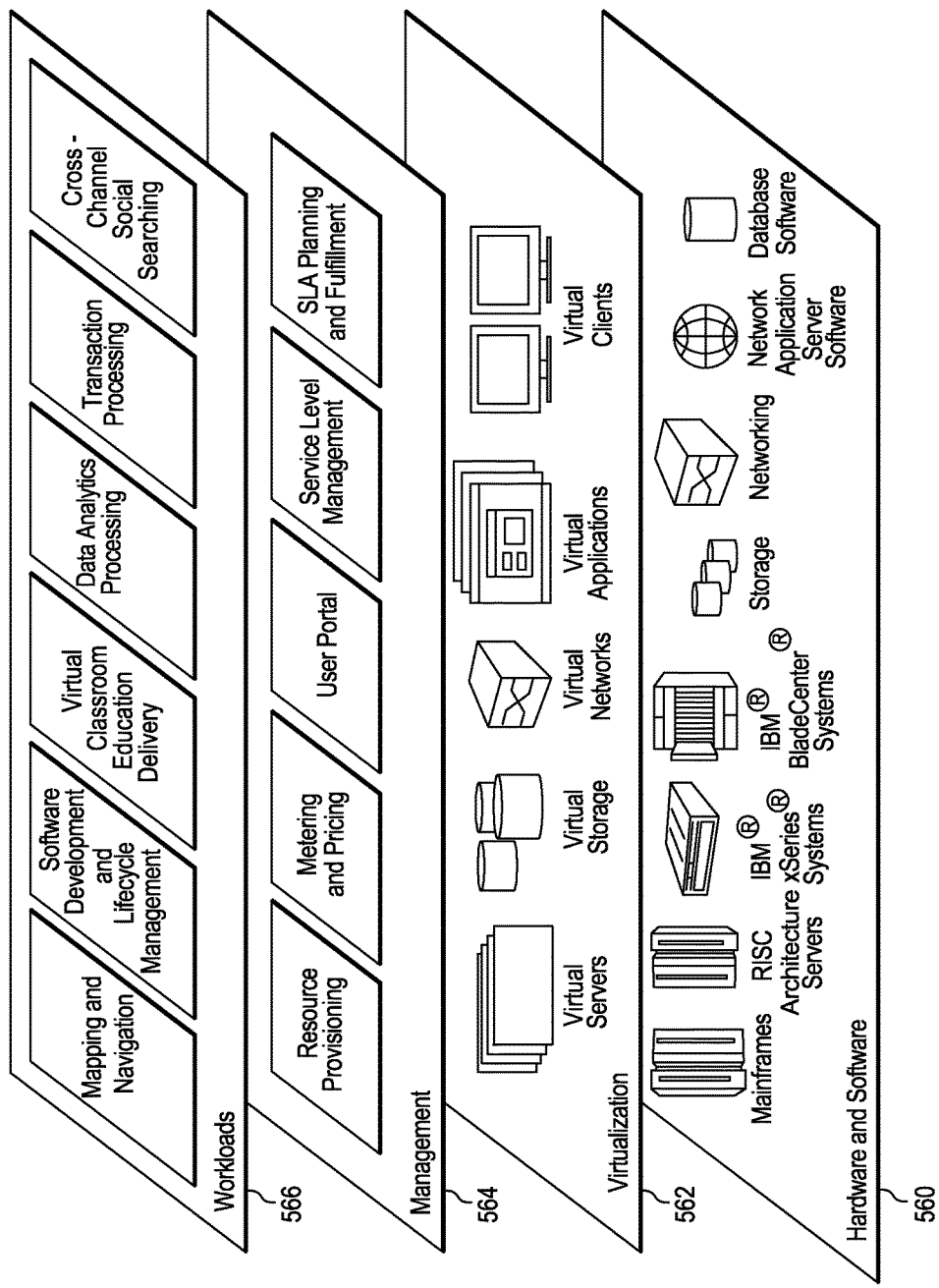
FIG. 5 depicts an example set of functional abstraction layers provided by a cloud computing environment.

Referring now to FIG. 5, a set of functional abstraction layers provided by cloud computing environment 450 (FIG. 2) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 562 provides an abstraction layer from which the following examples of virtual entities may be provided: virtual servers; virtual storage; virtual networks, including virtual private networks; virtual applications and operating systems; and virtual clients.

In one example, management layer 564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cross-channel social searching.

What is claimed is:

1. A method for processing search results, the method comprising:
   receiving the search results, the search results generated by a search engine in response to a search query entered by a user, the search results including a first result, the first result containing a first set of identifying data;
   matching the first result with a first profile on a first social network, the first profile containing a second set of identifying data, the second set of identifying data satisfying matching criteria for similarity with the first set of identifying data, the first social network having previously been merged with a second social network;
   generating a probability distribution of similarity scores, wherein:
      the similarity scores are calculated based on similarities and discrepancies between the identifying data in the first profile and the second profile and indicate a likelihood that the first profile and the second profile represent the same individual, and
      the probability distribution indicates a stronger probabilistic weight of the first profile to the second profile over the distribution between the first profile and one or more other profiles containing identifying data, wherein the probability distribution is determined using a cosine similarity and a Jaccard coefficient;
   ranking, using a rank aggregation method, the search results, wherein the rank aggregation method combines a ranking based on information relevancy with a ranking of the probability distribution of similarity scores; and
   calculating a probabilistic shortest path between the first profile on the first social network and a second profile on the second social network, the second social network profile being determined by the user, wherein the probabilistic shortest path accounts for a probability distribution of similarity scores and is based on the ranking.

2. The method of claim 1, further comprising:
displaying the first result with a representation of the probabilistic shortest path.

3. The method of claim 1, further comprising:
merging the first social network with the second social network.

4. The method of claim 3, wherein merging the first social network with the second social network comprises:
linking a third profile on the first social network with a fourth profile on the second social network, the third profile having a third set of identifying data, the fourth profile having a fourth set of identifying data, the third set of identifying data satisfying linking criteria for similarity with the fourth set of identifying data.

5. The method of claim 1, further comprising:
processing the search query on a source of unstructured information; and
generating the search results.

6. The method of claim 1, further comprising:
calculating a distance from the first result to a user designated location; and
removing the first result if the calculated distance is greater than a specified distance.

7. The method of claim 1, further comprising:
ranking the results using a rank aggregation method to aggregate a first rank based on information relevancy with a second rank based on the length of the probabilistic shortest path.

8. The method of claim 1, wherein the rank aggregation method is a Kemeny optimal aggregation.

9. A computer program product for processing search results, the computer program product comprising a computer readable storage medium, wherein the computer-readable storage medium is not a transitory signal per se, having program code embodied therewith, the program code executable by a computer system to perform a method comprising:
receiving, by the computer system, the search results, the search results produced by a search engine in response to a search query entered by a user, the search results including a first result, the first result containing a first set of identifying data;
matching, by the computer system, the first result with a first profile on a first social network, the first profile containing a second set of identifying data, the second set of identifying data satisfying matching criteria for similarity with the first set of identifying data, the first social network having previously been merged with a second social network;
generating, by the computer system, a probability distribution of similarity scores, wherein:
the similarity scores are calculated based on similarities and discrepancies between the identifying data in the first profile and the second profile and indicate a likelihood that the first profile and the second profile represent the same individual, and
the probability distribution indicates a stronger probabilistic weight of the first profile to the second profile over the distribution between the first profile and one or more other profiles containing identifying data wherein the probability distribution is determined using a cosine similarity and a Jaccard coefficient;
ranking, using a rank aggregation method, the search results, wherein the rank aggregation method combines a ranking based on information relevancy with a ranking of the probability distribution of similarity scores; and calculating, by the computer system, a probabilistic shortest path between the first profile on the first social network and a second profile on the second social network, the second social network profile being determined by the user, wherein the probabilistic shortest path accounts for a probability distribution of similarity scores, and is based on the ranking.

10. The computer program product of claim 9, wherein the method further comprises:
displaying, by the computer system, the first result with a representation of the probabilistic shortest path.

11. The computer program product of claim 9, wherein the method further comprises:
merging, by the computer system, the first social network with the second social network.

12. The computer program product of claim 11, wherein merging the first social network with the second social network comprises:
linking a third profile on the first social network with a fourth profile on the second social network, the third profile having a third set of identifying data, the fourth profile having a fourth set of identifying data, the third set of identifying data satisfying linking criteria for similarity with the fourth set of identifying data.

13. The computer program product of claim 9, wherein the method further comprises:
processing, by the computer system, the search query on a source of unstructured information; and
generating, by the computer system, the search results.

14. The computer program product of claim 9, wherein the method further comprises:
calculating, by the computer system, a distance from the first result to a user designated location; and
removing, by the computer system, the first result if the calculated distance is greater than a specified distance.

15. The computer program product of claim 9, wherein the method further comprises:
ranking, by the computer system, the results using a rank aggregation method to aggregate a first rank based on information relevancy with a second rank based on the length of the probabilistic shortest path.

16. The computer program product of claim 9, wherein the rank aggregation method is a Kemeny optimal aggregation.

17. A cross-channel search system, comprising:
one or more computer processing circuits configured to:
merge two or more social networks by linking profiles with identifying data which satisfies linking criteria for similarity;
match search results to profiles on the two or more previously merged social networks by matching identifying data which satisfies matching criteria for similarity;
generate a probability distribution of similarity scores, wherein:
the similarity scores are calculated based on similarities and discrepancies between the identifying data in the first profile and the second profile and indicate a likelihood that the first profile and the second profile represent the same individual, and
the probability distribution indicates a stronger probabilistic weight of the first profile to the second profile over the distribution between the first profile and one or more other profiles containing identifying data, wherein the probability distribution is determined using a cosine similarity and a Jaccard coefficient;

rank, using a rank aggregation method, the search results, wherein the rank aggregation method combines a ranking based on information relevancy with a ranking of the probability distribution of similarity scores; and calculate a probabilistic shortest path between the matched profiles and a profile determined by the user, the calculating using a probability distribution of similarity scores, and is based on the ranking.

18. The system of claim 17, wherein the one or more computer processing circuits are further configured to:
rank the results using a rank aggregation method to combine a first ranking based on relevancy with a second ranking based on the length of the probabilistic shortest path, wherein the probabilistic shortest path accounts for a probability distribution of similarity scores.

19. The system of claim 17, wherein the one or more computer processing circuits are further configured to:
calculate a distance between the results and a user designated location and removing results which are further than a specified distance away from the user designated location.

20. The system of claim 17, wherein the rank aggregation method is a Kemeny optimal aggregation.

* * * * *